(12) United States Patent
Smith

(10) Patent No.: US 7,120,090 B2
(45) Date of Patent: Oct. 10, 2006

(54) METHOD OF DETERMINING A TIMING OFFSET BETWEEN A FIRST CLOCK AND A SECOND CLOCK IN A COMMUNICATIONS NETWORK

(75) Inventor: James David Smith, Notts (GB)

(73) Assignee: Siemens plc, Bracknell (GB)

( * ) Notice: Subject to any disclaimer, the term of this patent is extended or adjusted under 35 U.S.C. 154(b) by 0 days.

(21) Appl. No.: 10/532,486

(22) PCT Filed: Oct. 20, 2003

(86) PCT No.: PCT/EP03/11652

§ 371 (c)(1),
(2), (4) Date: Sep. 9, 2005

(87) PCT Pub. No.: WO2004/038971

PCT Pub. Date: May 6, 2004

(65) Prior Publication Data

US 2006/0126437 A1 Jun. 15, 2006

(30) Foreign Application Priority Data

Oct. 25, 2002 (GB) ................................. 0224864.9

(51) Int. Cl.
*G04B 47/00* (2006.01)
*G04F 8/00* (2006.01)
*H04L 7/00* (2006.01)
*G06F 1/12* (2006.01)

(52) U.S. Cl. ........................... 368/10; 368/46; 368/113; 375/354; 375/356; 709/248; 713/400

(58) Field of Classification Search .................. 368/10, 368/46, 47, 113, 115, 156; 375/354, 356; 709/248; 713/400, 501, 600
See application file for complete search history.

(56) References Cited

U.S. PATENT DOCUMENTS 4,847,872 A * 7/1989 Hespelt et al. ............... 375/344

(Continued)

FOREIGN PATENT DOCUMENTS

| EP | 0 697 774 A | 2/1996 |
| EP | 1 215 559 A | 6/2002 |
| WO | WO 91 11763 A | 8/1991 |

OTHER PUBLICATIONS

Fasbender, A. et al: "On assessing unidirectional latencies in packet-switched networks", Communications, 1997. ICC '97 Montreal, Towards the Knowledge of Millennium, 1997 IEEE Inter'l Conference on Montreal, Que., Canada Jun. 8-12, 1997, New York, NY, USA IEEE, US, pp. 490-494.

(Continued)

*Primary Examiner*—Vit W. Miska
(74) *Attorney, Agent, or Firm*—Crowell & Moring LLP

(57) ABSTRACT

A system for determining a timing offset between a first clock and a second clock at respective first and second points in a communications network. A series of request signals is transmitted from the first point in the network to the second point in the network. A series of reply signals is transmitted from the second point in the network to the first point in the network. Each reply signal and a corresponding reply signal having a minimum round trip delay time are identified and a minimum single leg delay time is determined from the minimum round trip delay time. A timing offset between the clock values of the first clock and the second clock at a first instance is estimated, the estimation being based upon the minimum single leg delay time, and a transmission time and a reception time of one of the identified request signal and the corresponding reply signal, as given by the respective clocks at the transmission and reception points of the signal.

13 Claims, 2 Drawing Sheets

U.S. PATENT DOCUMENTS

| | | | | |
|---|---|---|---|---|
| 5,579,513 | A | * | 11/1996 | Strohmer .................... 713/600 |
| 5,958,060 | A | * | 9/1999 | Premerlani .................. 713/400 |
| 6,104,767 | A | * | 8/2000 | Atarius et al. .............. 375/344 |
| 6,148,049 | A | * | 11/2000 | Hein .......................... 375/354 |
| 6,199,169 | B1 | * | 3/2001 | Voth ........................... 713/400 |
| 6,438,702 | B1 | * | 8/2002 | Hodge ........................ 713/400 |
| 6,502,141 | B1 | * | 12/2002 | Rawson, III ................ 713/375 |
| 2002/0120416 | A1 | * | 8/2002 | Liu et al. ..................... 702/79 |
| 2002/0131370 | A1 | | 9/2002 | Chuah |
| 2002/0133733 | A1 | | 9/2002 | Abdel-Ghaffar |
| 2002/0136335 | A1 | | 9/2002 | Schollmeler |

OTHER PUBLICATIONS

Mills, D.L.: "Internet Time Synchronization: The Network Time Protocol", IEEE Transactions on Communications, IEEE Inc. New York, US, vol. 39, Nr. 10, pp. 1482-1493.

* cited by examiner

METHOD OF DETERMINING A TIMING OFFSET BETWEEN A FIRST CLOCK AND A SECOND CLOCK IN A COMMUNICATIONS NETWORK

BACKGROUND

1. Field of Invention

This invention relates to a method of determining a timing offset between a first clock and a second clock in a communications network.

2. Background of the Invention

It is standard for a device connected to a computer network to have an internal clock for time keeping purposes. Typical hardware clocks provide millisecond resolution and timing. Usually, the internal clocks of two or more devices communicating over a network run independently of each other and thus may not be synchronised. For certain types of network communication, it is desirable that the timing offset between the unsynchronised internal clocks of the two or more communicating devices be known or be predictable. For example, measuring network delay in an IP network is simplified if the timing offset between the clocks of the communicating devices is known.

Network delay in an IP network is a measure of how long it takes for a packet to get from one point in the network to another. Network delay can be measured either for a packet round trip, or in a single direction.

One method for measuring round trip delay involves using the well-known network 'ping' feature. The 'ping' feature echoes back a packet from its reception point to the point in the network where the packet was initially transmitted. The round trip delay time is simply calculated as the difference between the time the packet was received back at its starting point and the time the packet was initially sent from its starting point. Since this calculation is reliant only on the timing of the clock at the starting point there is no need for the starting point clock and the reception point clock to be synchronised.

One known method for measuring single direction network delay relies on an absolute clock to synchronise the timing of the clock at the network starting point and the timing of the clock at the network end point. Provided the clocks at the network start and end points are synchronised to an absolute clock, single direction delay is simply measured as the difference between the time a packet is received at the endpoint and the time the packet is sent from the starting point. The clocks at the start and end points may for example be synchronised to a Global Positioning System (GPS) time receiver or any other such source of absolute time measurement.

RFC 1305 describes The Network Time Protocol (NTP). The NTP is designed to distribute time information from an absolute time source to devices in a large network such as the Internet.

Jitter is the amount that packet transmission rate varies from the mean during a current time period. Jitter measurements assume a set interval between packets being sent as part of the test. Thus jitter measurements only give an indication of delay effects by a comparison of the measured interval between two packets being received and the set packet transmission interval. Jitter measurements do not give the single direction delays experienced by individual packets.

It is desirable to be able to determine or predict the timing offset between two clocks in a computer network. This would have many advantages, including allowing one way network delay to be determined without having to use an absolute clock to synchronise the clocks at the network transmission and reception points.

SUMMARY OF THE INVENTION

According to the invention there is provided a method for determining a timing offset between a first clock and a second clock at respective first and second points in a communications network, the method comprising: transmitting a plurality of request signals from the first point in the network to the second point in the network; receiving at the first point in the network a plurality of reply signals transmitted from the second point in the network, each reply signal corresponding to a respective one of the plurality of request signals; identifying a first request signal and a corresponding reply signal having a minimum round trip delay time; determining from the minimum round trip delay time a minimum single leg delay time; and estimating a timing offset between the clock values of the first clock and the second clock at a first instance, the estimation being based upon the minimum single leg delay time, and a transmission time and a reception time of one of the identified request signal and the corresponding reply signal, as given by the respective clocks at the transmission and reception points of the signal.

BRIEF DESCRIPTION OF THE DRAWINGS

An example of the invention will now be described with reference to the accompanying drawings, in which.

DETAILED DESCRIPTION OF THE PREFERED EMBODIMENT

Figure 1:
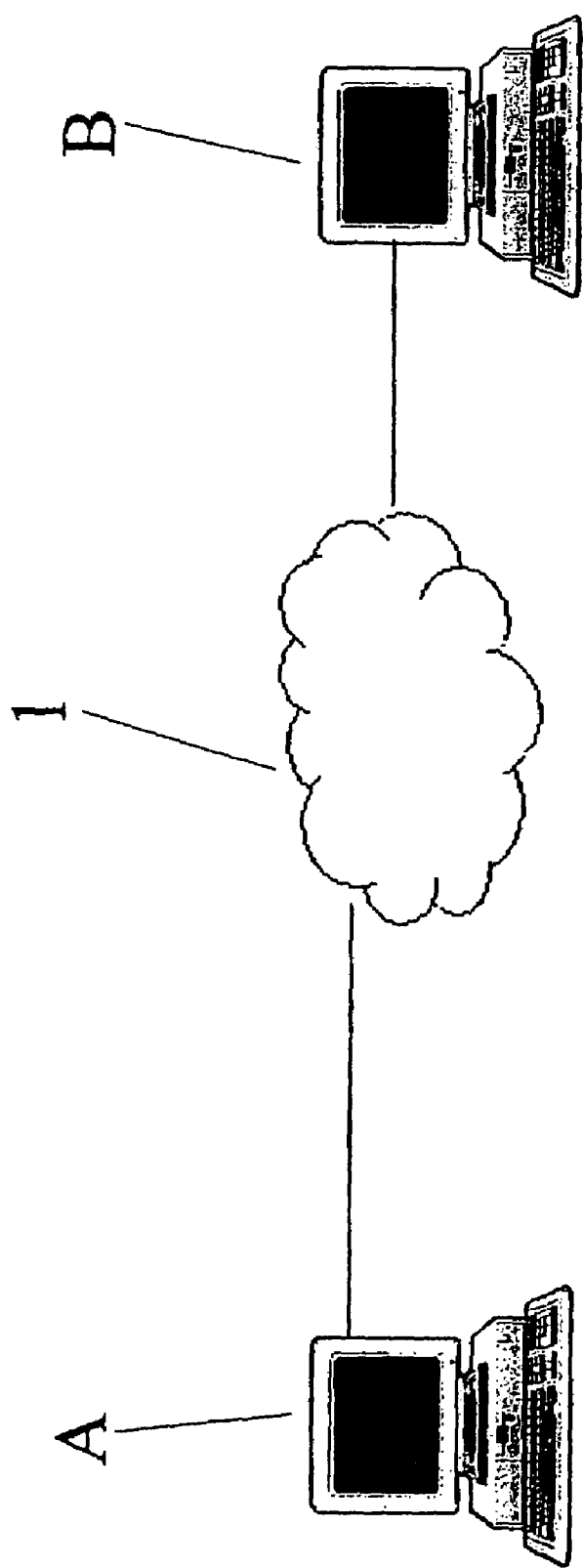
FIG. 1 illustrates a communications network.

Referring to FIG. 1 of the accompanying drawings there is illustrated a communications network 1 comprising a first terminal A and a second terminal B. In this embodiment of the invention, the first terminal A and the second terminal B are both PCs and the communications network 1 is an IP based network, for example a corporate Local Area Network (LAN).

The first terminal A and the second terminal B each comprises an internal hardware clock (not shown). The internal clocks of the first terminal A and the second terminal B are not synchronised and thus at a given time, a synchronisation or timing offset δ exists between the two clocks. The timing offset δ may be defined as:

$$\delta = T_B - T_A \quad (1)$$

where $T_A$ is the time indicated by the clock of the first terminal A and simultaneously, $T_B$ is the time indicated by the clock of second terminal B.

Whilst independently running clocks of PCs such as the first terminal A and second terminal B can be expected to keep reasonably regular frequencies (i.e. time intervals), it is unlikely that the frequencies will be the same. If, the clock of the first terminal A runs at a frequency $f_1$ and the clock of the second terminal B runs at a different frequency $f_2$ the skew of the clocks is defined as:

$$f_2 - f_1 \quad (2)$$

Since the skew of the clocks of the first terminal A and second terminal B is non zero, the synchronisation offset δ is not constant but instead varies linearly with time.

Terminal A is arranged to transmit a series of test data packets over communications network 1 to terminal B. Each test data packet received at terminal B is retransmitted back to terminal A. The network path followed by the packets on their round trip is symmetrical.

As will be explained in more detail below, timing information obtained from the respective clocks at terminal A and terminal B and stamped into the test packets is processed by terminal A to determine a timing offset between the respective clocks at terminals A and B. This in turn, allows a clock value at one of the clocks to be predicted given the corresponding clock value at the other clock.

Figure 2:
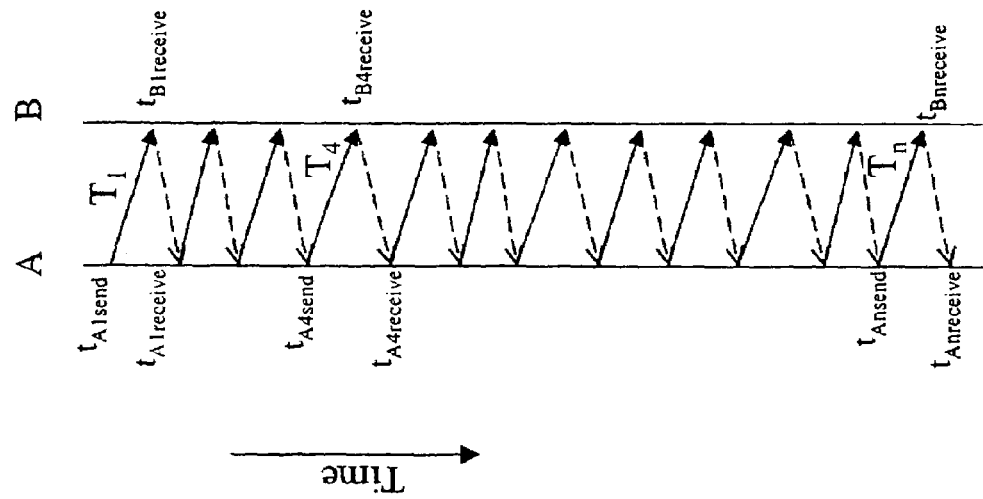
FIG. 2 illustrates a packet timing diagram.

FIG. 2 of the accompanying drawings illustrates a time diagram of the test data packets passed between the first terminal A and the second terminal B. In FIG. 2, a first test packet ($T_1$) is sent by the first terminal A at a time $t_{A1send}$ as taken from the first terminal A's internal clock. A packet sequence number and a time stamp indicating the time $t_{A1send}$ are included in the first test packet ($T_1$). The first packet ($T_1$) is received at the second terminal B at a time $t_{B1receive}$ as taken from second terminal B's internal clock.

On receiving the first packet ($T_1$), the second terminal B adds to the packet a time stamp indicating the time $t_{B1receive}$ as taken from the second terminal B's internal clock that the packet is received at terminal B, and immediately echoes the packet back to the first terminal A. Thus in this embodiment, the time that the packet is received at terminal B and the time that the packet is then transmitted from terminal B are taken as being the same.

The echoed first packet ($T_1$) is received back at the first terminal A at a time $t_{A1receive}$ as taken from the first terminal A's internal clock. The sequence number and the times $t_{A1send}$, $t_{B1receive}$ are read from the first packet ($T_1$) and together with $t_{A1receive}$ are stored in memory at the first device A.

As is illustrated in FIG. 2, the above described steps are repeated in sequence for each of n test packets. The packets are transmitted from terminal A at a regular interval. For simplicity, only the times $t_{A1send}$, $t_{B1receive}$, and $t_{A1receive}$ for the packets of sequence numbers one, four and n are shown in FIG. 2.

The sequence numbers and the time stamps included in the test packets echoed back to the first terminal A are used to construct the timings base illustrated below in Table 1.

TABLE 1

| | Packet Sequence | | | | |
|---|---|---|---|---|---|
| | 1 | 2 | 3 | 4 | 5 |
| Time sent by Terminal A | $t_{A1send}$ | $t_{A2send}$ | $t_{A3send}$ | $t_{A4send}$ | $t_{A5send}$ |
| Time received by Terminal B | $t_{B1receive}$ | $t_{B2receive}$ | $t_{B3receive}$ | $t_{B4receive}$ | $t_{B5receive}$ |
| Time received by Terminal A | $t_{A1receive}$ | $t_{A2receive}$ | $t_{A3receive}$ | $t_{A4receive}$ | $t_{A5receive}$ |

| | Packet Sequence | | | | |
|---|---|---|---|---|---|
| | 6 | 7 | 8 | n − 1 | N |
| Time sent by Terminal A | $t_{A6send}$ | $t_{A7send}$ | $t_{A8send}$ | $t_{An-1send}$ | $t_{Ansend}$ |
| Time received by Terminal B | $t_{B6receive}$ | $t_{B7receive}$ | $t_{B8receive}$ | $t_{Bn-1receive}$ | $t_{Bnreceive}$ |
| Time received by Terminal A | $t_{A6receive}$ | $t_{A7receive}$ | $t_{A8receive}$ | $t_{An-1receive}$ | $t_{Anreceive}$ |

For any given packet of sequence number i the round trip delay ($RTD_i$) across the network 1 between the first terminal A and the second terminal B is equal to the time given by terminal A's clock when the echoed packet was received back at terminal A minus the time given by terminal A's clock when the packet was originally sent from terminal A:

$$RTD_i = t_{Aireceive} - t_{Aisend} \quad (3)$$

The network path between the first terminal A and the second terminal B is a variable delay path. The time taken for packets to travel the send leg between the first terminal A and the second terminal B will vary, depending upon a number of factors, including network load. Likewise, the time taken for packets to travel the return leg between the second terminal B and the first terminal A will also vary. Thus the RTD of the packets used to construct the timing base illustrated in Table 1 will vary from packet to packet.

For a timings base constructed from a large enough sequence of packets, it can be assumed that the packet having the minimum RTD between terminals A and B, will also have the minimum send leg delay and also the minimum return leg delay. Furthermore, for a symmetrical network path between the first terminal A and the second terminal B it can be assumed that the minimum send leg delay and the minimum return leg delay are equal.

Thus defining the minimum single leg delay $\Delta_{mx}$ as being equal to half the minimum RTD, in the notation of table 1:

$$\Delta_{mx} = (t_{Amxreceive} - t_{Amxsend})/2 \quad (4)$$

where the index mx indicates the sequence number of a test packet having a minimum RTD.

When the packet of sequence number mx was sent form terminal A to terminal B, if the clocks at the two terminals A and B were synchronised, the condition:

$$t_{Bmxreceive} = t_{Amxsend} + \Delta_{mx} \quad (5)$$

would hold.

However, as mentioned above, at any given time, the clocks at terminal A and terminal B have a timing offset $\delta$ and so condition (5) does not hold.

Instead, if $\delta_{mx}$ is the timing offset between the two clocks at the time the packet of sequence number mx is sent to terminal B the following condition holds:

$$t_{Bmxreceive} = t_{Amxsend} + \Delta_{mx} + \delta_{mx} \quad (6)$$

thus giving:

$$\delta_{mx} = t_{Bmxreceive} - t_{Amxsend} - \Delta_{mx} \quad (7)$$

Thus, by identifying a packet having a minimum RTD between terminals A and B, terminal A can process the information $t_{Amxsend}$, $t_{Amxreceive}$ and $t_{Bmxreceive}$ according to equations (4) and (7) to determine $\delta_{mx}$.

At the instance of the packet of sequence number mx the relationship between the clock value $TB_{mx}$ at terminal B and the clock value $TA_{mx}$ at terminal A is:

$$TB_{mx} = TA_{mx} + \delta_{mx} \quad (8)$$

As previously mentioned, in this embodiment, the timing offset $\delta$ is not a constant. The clock at terminal A and the clock at terminal B run at different frequencies and thus the timing offset $\delta$ varies linearly with time.

Further information is needed to allow terminal A to predict any clock value at terminal B from the corresponding simultaneous clock value at terminal A. To obtain this further information, terminal A identifies a second packet in the sequence having a minimum RTD and in the manner described above, a value $\delta_{my}$ of the timing offset between the two clocks at the time this packet is sent to terminal B is determined.

Since in this example the timing offset δ is not a constant, $\delta_{mx}$ is not equal to $\delta_{my}$. However, because the timing offset δ varies linearly with time, $\delta_{mx}$ and $\delta_{my}$ can be considered as being two terms in an arithmetic progression.

An arithmetic progression is a series in which each term differs from the previous term by the same amount. The Nth term of an arithmetic progression $\sigma_N$ may be expressed as:

$$\sigma_N = a + Md \quad (9)$$

where a and d are constants and M is the Nth term of another arithmetic progression (for example M=1, 2, 3 etc or M=10, 20, 30 etc).

Thus the arithmetic progression δ may be expressed as $$\delta = a + Md \quad (10)$$

If $\delta_{mx}$ and $\delta_{my}$ are the Xth and Yth terms respectively in the arithmetic progression δ, $\delta_{mx}$ may be expressed as:

$$\delta_{mx} = a + M_x d \quad (11)$$

and $\delta_{my}$ may also be expressed as $$\delta_{my} = a + M_y d \quad (12)$$

where $M_x$ and $M_y$ are the Xth and Yth terms in an arithmetic progression M. In one embodiment of the invention, M may be taken as the simple arithmetic progression 1, 2, 3 . . . etc, defined by the sequence numbers of the packets used to construct the timings base. Thus, $\delta_{mx}$, $\delta_{my}$, $M_x$ and $M_y$ are all known to terminal A, allowing terminal A to calculate the constants a and d in accordance with the equations:

$$d = \frac{\delta_{mx} - \delta_{my}}{M_x - M_y} \quad (13)$$

and $$a = \delta_{my} - M_y d \quad (14)$$

Having calculated the constants a and d, terminal A can determine the value of any term in the arithmetic progression δ in accordance with equation (10).

For any given calculated timing offset value δ, terminal A can then predict the clock time at terminal B from the corresponding clock time at terminal A in accordance with equation (1).

If more than two packets in the sequence are identified as having a minimum RTD, preferably, the one having the lowest sequence number and the one having the highest sequence number are selected for use in determining $\delta_{mx}$ and $\delta_{my}$. This maximises the accuracy in the predicted value of any other term in the progression δ and hence any predicted clock time at terminal B.

Table 2 shows for a sequence of eleven packets transmitted between terminal A and terminal B example measured values of $t_{Asend}$, $t_{Areceive}$, $t_{Breceive}$ and the RTD for the packets.

TABLE 2

| | Sequence | | | | | | | | | | |
|---|---|---|---|---|---|---|---|---|---|---|---|
| | 1 | 2 | 3 | 4 | 5 | 6 | 7 | 8 | 9 | 10 | 11 |
| $t_{Asend}$ | 10 | 30 | 50 | 70 | 90 | 110 | 130 | 150 | 170 | 190 | 210 |
| $t_{Breceive}$ | 101 | 125 | 145 | 169 | 190 | 211 | 234 | 256 | 277 | 300 | 321 |
| $t_{Areceive}$ | 13 | 35 | 52 | 76 | 94 | 112 | 133 | 155 | 172 | 194 | 213 |
| RTD | 3 | 5 | 2 | 6 | 4 | 2 | 3 | 5 | 2 | 4 | 3 |
| $\Delta_m$ | | | 1 | | | | | | 1 | | |
| δ | 90 | 92 | 94 | 96 | 98 | 100 | 102 | 104 | 106 | 108 | 110 |
| Clock B predicted for send | 100 | 122 | 144 | 166 | 188 | 210 | 232 | 254 | 276 | 298 | 320 |
| Send leg delay | 1 | 3 | 1 | 3 | 2 | 1 | 2 | 2 | 1 | 2 | 1 |
| Return leg delay | 2 | 2 | 1 | 3 | 2 | 1 | 1 | 3 | 1 | 2 | 2 |

In this example, packets of sequence numbers three and nine are identified by terminal A as being packets having a minimum RTD of value 2, and thus a minimum single leg delay of value 1.

For the packet of sequence number 3, terminal A processes the relevant values of $t_{Bmreceive}$, $t_{Amsend}$ and $\Delta_m$ according to equation (7) to give a clock offset value $\delta_3$:

$$\delta_3 = 94$$

and for the packet of sequence number 9, terminal processes the relevant values of $t_{Bmeceive}$, $t_{Amsend}$ and $\Delta_m$ according to equation (7) to give a clock offset value $\delta_9$:

$$\delta_9 = 106$$

If terminal A uses the packet sequence number values of 3 and 9 as suitable values for $M_x$ and $M_y$, then substituting for $M_x=3$, $M_y=9$, $\delta_{mx}=94$ and $\delta_{my}=106$ into equations (13) and (14) gives:

$$d = \frac{106-94}{9-3} = \frac{12}{6} = 2 \text{ and } a = 94 - 3 \times 2 = 88$$

Hence, in accordance with equation (10) terminal A can use the values for a and d to determine the value of any of the terms in the arithmetic progression $\delta$.

For any given calculated clock offset value $\delta$, terminal A can then predict the clock time at terminal B from the corresponding clock time at terminal A in accordance with the equation (1).

For example, when the packet of sequence number 10 was sent from terminal A, the clock at terminal A was 190.

Substituting for a=88, d=2 and M=10 into equation (10) gives:

$$\delta_{10} = 88 + 10 \times 2$$

$$\delta_{10} = 88 + 20$$

$$\delta_{10} = 108$$

and hence from equation (1) terminal A estimates the time given by the clock of terminal B when terminal A's clock was at 190 as being:

190+108=298

Since the clock time at terminal B can be predicted from the clock time at terminal A, the send leg delay and the receive leg delay for any packets sent between terminal A and terminal B can be easily determined. For example, for the packet of sequence number 10 the clock time at terminal B when the packet was sent from A is predicted to be of value 298. The clock time at terminal B when the packet was received at terminal B is known to have been of value 300 and hence the send leg delay is calculated to be of value 2. Since the round trip delay of the packet is known to be of value 4, the return leg delay can be calculated by simple subtraction as a value of 2. Alternatively, the return leg delay may be calculated in a similar manner to the send leg delay. The clock time at terminal B when the packet was transmitted back to terminal A is known to be of value 300. Since, $\delta_{10}=108$, the corresponding clock value at terminal A is predicted to be of value 192. The clock time at terminal A when the packet is received back at terminal A is known to be of value 194, giving by subtraction a return leg delay of value 2.

It can be seen from table 2, that the output of the clock at the first terminal is itself an arithmetic progression. Thus in one embodiment, rather than using packet sequence numbers, terminal A may instead use its clock output to provide suitable values for $M_x$ and $M_y$. Thus, substituting for $M_x=50$, $M_y=170$, $\delta_{mx}=94$ and $\delta_{my}=106$ into equations (13) and (14) gives values for a and d as:

$$d = \frac{106-94}{170-50} = \frac{12}{120} = 0.1$$

and, $a = 94 - 50 \times 0.1 = 89$.

Again using the packet of sequence number 10 as an example, terminal A may substitute for a=89, d=0.1 and M=190 into equation (10) to give:

$\delta_{190} = 89 + 190 \times 0.1$ $\delta_{190} = 89 + 19$ $\delta_{190} = 108$ and hence from equation (1) terminal A predicts the time given by the clock of terminal B when terminal A's clock was at 190 as being:

190+108=298 which is consistent with the value predicted using packet sequence numbers as values for M.

In the above described examples, values for $t_{Bmreceive}$, $t_{Amsend}$ of a send leg packet (i.e transmitted from terminal A to terminal B) are used in accordance with equation (7) to determine a value for a timing offset. It will be appreciated, that values for $t_{Bmsend}$, $t_{Amreceive}$ of a return leg packet (i.e one echoed back from terminal B to terminal A) could equally well be used.

In an embodiment of the invention first terminal A and second terminal B contain processors programmed to perform the required functions of the terminals described above.

Over extended time periods, the frequency of the clocks at terminals such as terminals A and B may drift because of external influences such as temperature. Periodically therefore, to counter such effects, a new series of test packets should be transmitted between the terminals to allow recalibration of the arithmetic progression constants defined in equations (12) and (13).

It will be appreciated that minimum RTD's may vary with network conditions and so the packets used to caluculate values for $\delta_{mx}$ and $\delta_{my}$ need not necessarily have the same value for their RTD.

In the above specific description, first terminal A and second terminal B are described as being PCs. It will be appreciated that either terminal A or terminal B can be any type of device that may be connected to a network. For example, a printer, an IP phone, a router, a server or specialised network test equipment.

In the above specific description, network 1 is described as being a corporate LAN. It will be appreciated that the network 1 may be any type of network to which terminals can be connected or indeed a combination of inter connected networks.

In the embodiment described in detail above, the timing offset $\delta$ between the clocks at terminals A and B is not a constant, and hence the measured value of $\delta_{mx}$ is not equal to the measured value of $\delta_{my}$. In an alternative embodiment, there is no frequency offset between the clocks at terminals A and B and hence the timing offset $\delta$ remains constant. In this embodiment the measured values of $\delta_{mx}$ and $\delta_{my}$ are compared and found to be of the same value indicating that $\delta$ is constant.

In one embodiment the information included in the test packets may be added to normal data-carrying packets travelling between terminals A and B.

The above described techniques may be used to make measurements of the send and receive delays for two-way real-time transmissions in an IP network, such as Voice over IP (VOIP).

While the invention has been described with reference to particular embodiments, it will be understood by those skilled in the art that the invention is not limited to those embodiments. Those skilled in the art will appreciate that various adaptations and changes of those embodiments may be made without departing from the scope of the invention as defined in the following claims.

The invention claimed is:

1. A method for determining a timing offset between a first clock and a second clock at respective first and second points in a communications network, the method comprising:

transmitting a plurality of request signals from the first point in the network to the second point in the network;

receiving at the first point in the network a plurality of reply signals transmitted from the second point in the network, each reply signal corresponding to a respective one of the plurality of request signals;

identifying a first request signal and a corresponding reply signal having a minimum round trip delay time;

determining from the minimum round trip delay time a minimum single leg delay time;

estimating a timing offset between the clock values of the first clock and the second clock at a first instance, the estimation being based upon the minimum single leg delay time, and a transmission time and a reception time of one of the identified request signal and the corresponding reply signal, as given by the respective clocks at the transmission and reception points of the signal;

identifying a second request signal and a second corresponding reply signal having another minimum round trip delay time; and estimating a second timing offset between the clock values of the first clock and the second clock at a second instant, the estimation being based upon the another minimum single leg delay time, and a transmission time and a reception time of one of the second identified request signal and the second corresponding reply signal, as given by the respective clocks at the transmission and reception points of the signal;

using the first timing offset and the second timing offset to estimate a third timing offset between the first and second clocks at a third instance, wherein the first and second timing offsets are treated as two terms in an arithmetic progression in order to estimate the third timing offset.

2. A method according to claim 1, wherein the third timing offset is used to calculate the clock value at the second clock at the third instance from the clock value at the first clock at the third instance.

3. A method according to claim 1, wherein the third timing offset is used to calculate a one way delay time of a signal.

4. A method according to claim 1, wherein each reply signal includes information indicating the clock time at the first clock when the reply signal was transmitted from the first point in the network.

5. A method according to claim 1, wherein each reply signal includes information indicating the clock time at the second clock when the request signal corresponding to the reply signal was received at the second point in the network.

6. A method according to claim 1, wherein each reply signal includes information indicating the clock time at the second clock when the reply signal was sent from the second point in the network.

7. A method according to claim 1, wherein each reply signal includes information indicating the clock time at the first clock when the request signal corresponding to the reply signal was sent from the first point in the network.

8. A method according to claim 1, wherein a minimum one way delay time is calculated as being half a minimum round trip delay.

9. A method according to claim 1, wherein the message and reply signals are packets.

10. A method according to claim 3, where the calculated one way delay time is that of a packet transmitted between the first and second points.

11. A method according to claim 10 wherein the packet is a VOIP packet.

12. A computer program arranged to perform the method of claim 1, when extended by a suitably arranged processing device.

13. A processing device programmed with the computer program claimed in claim 12.

* * * * *